Figure 4:
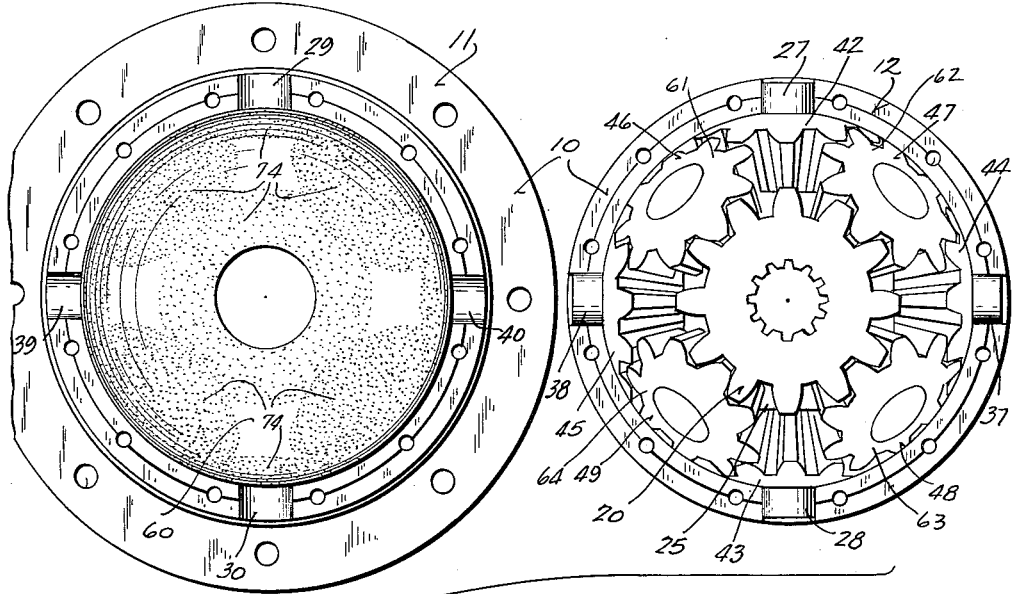

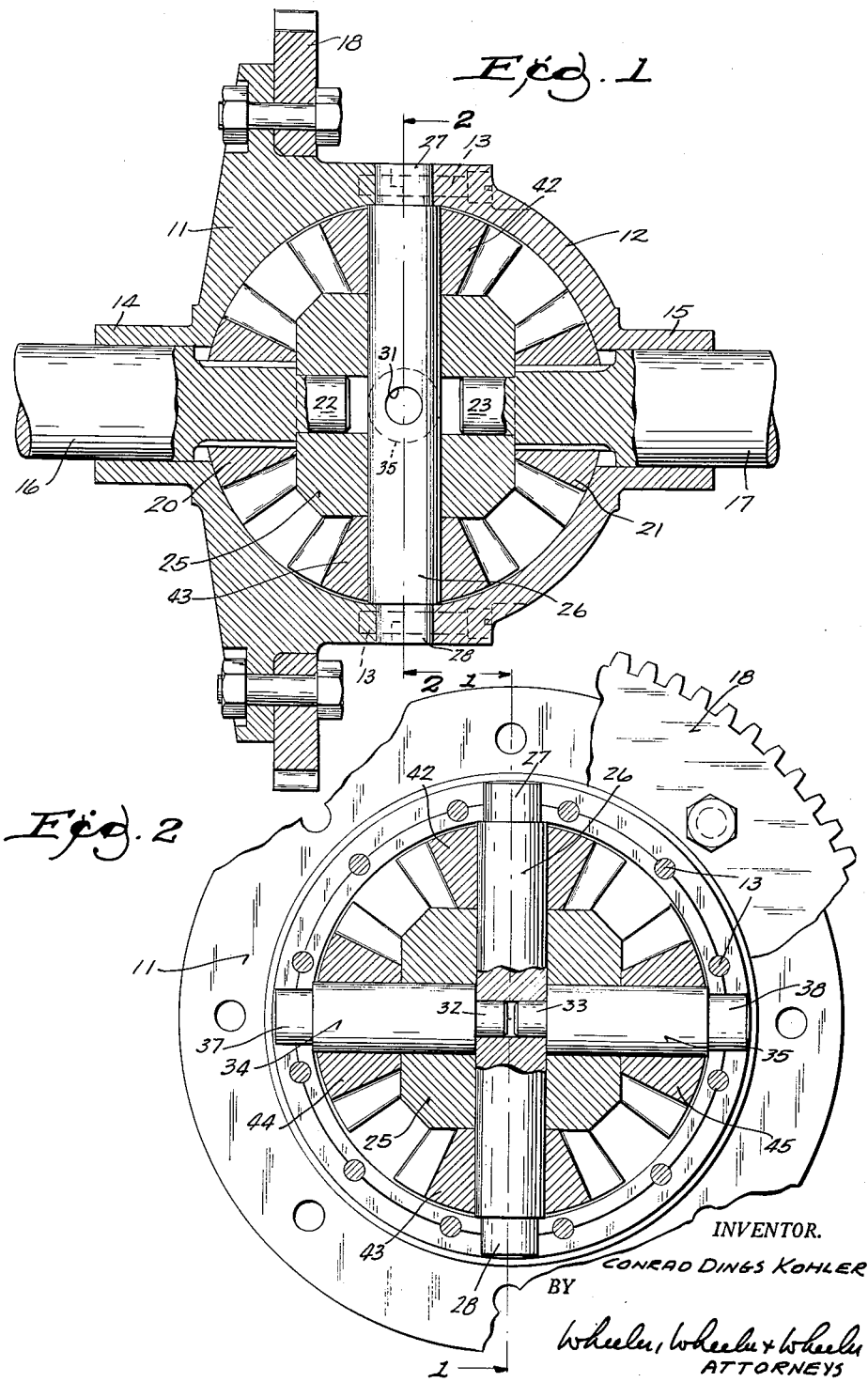

Aug. 21, 1962  C. D. KOHLER  3,049,942
DIFFERENTIAL WITH AUTOMATIC SLIP CONTROL
Filed Jan. 3, 1961  3 Sheets-Sheet 2

INVENTOR.
CONRAD DINGS KOHLER
BY
Wheeler, Wheeler & Wheeler
ATTORNEYS

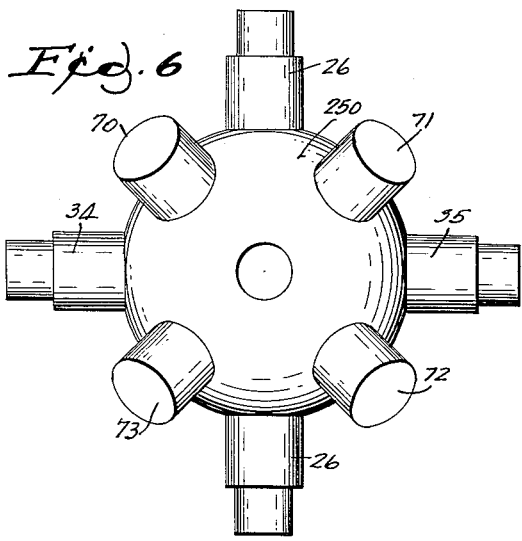
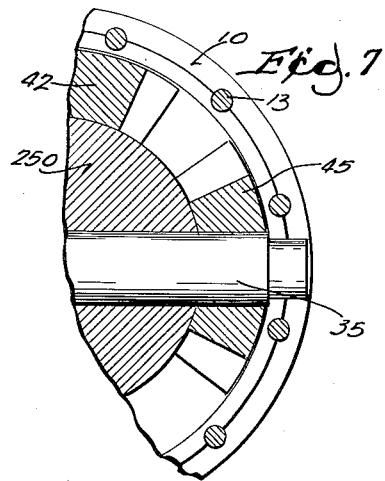
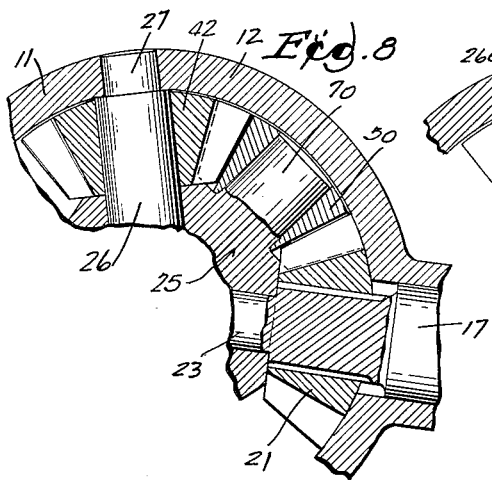
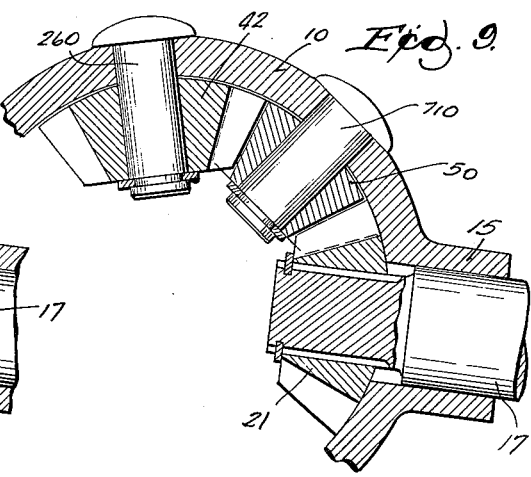
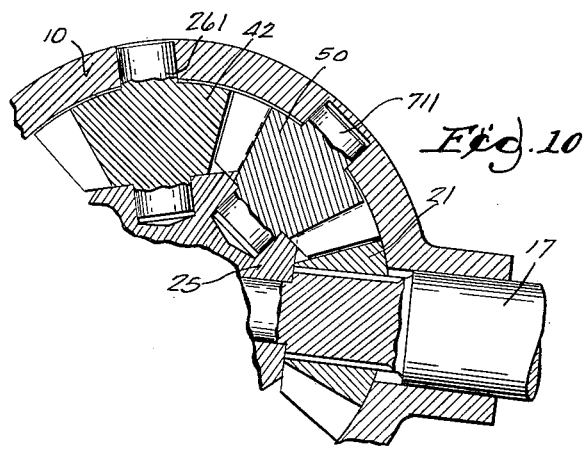

United States Patent Office 3,049,942
Patented Aug. 21, 1962

3,049,942
DIFFERENTIAL WITH AUTOMATIC SLIP CONTROL
Conrad Dings Kohler, Box 2, Kohler, Wis.
Filed Jan. 3, 1961, Ser. No. 80,093
6 Claims. (Cl. 74—710.5)

This invention relates to a differential with automatic control to preclude slipping of either of the differentially coupled wheels.

As is well-known, the slipping of one of two vehicle drive wheels coupled through a conventional differential will deprive the other of power, even though the other wheel has better traction. Previous attempts to assure delivery of power to the wheel that has traction have involved relatively complex mechanisms added to the structure inherently required for differential action. The known mechanisms for this purpose have operated on a principle such that the differential brake or lock becomes effective only after one of the wheels has started to slip, or the unit is mechanically activated. In addition, this activity merely serves to transfer power to the wheel with the most traction, even though the other wheel still may have a considerable amount of traction.

The present invention operates on a different principle. The differential is normally subject to braking action which resists differential movement. It functions as a differential only when one of the coupled wheels rotates more slowly and the other one more rapidly, as in turning a corner. Moreover, the present device automatically assures power to both wheels regardless of whether one has lost traction and achieves this result without any mechanism other than that which also provides the differential action. The preferred embodiment selected to exemplify the invention uses intermediate pinions between the differential gears and the axle gears. While the use of intermediate pinions is known per se, such use has significant advantages as an embodiment of the present invention. Moreover, unlike previous devices using intermediate pinions, each of the differential gears of the present differential is coupled through four intermediate gears to each of the axle gears. Each axle gear meshes with four intermediate gears. Each intermediate gear, on the other hand, meshes with one axle gear and two differential gears. Thus, the teeth of the differential gears and the axle gears are in multiples of four while the teeth of the intermediate gears are in multiples of three. Gear trains are continuous about both sides of the cage.

In the differential of the present invention, all of the gears are preferably in thrust bearing engagement frictionally with the cage. Specifically, the arrangement is such that the torque transmitted from the cage through the planetary gears to the axle-connected sun gears creates a reaction thrust, augmented by centrifugal force in normal operation, which urges each of the gears axially into housing engagement, thus frictionally braking gear rotation and ensuring uniform driving of the axles normally at a like rate. Because the axles are thus coupled at all times during normal straightforward operation of the vehicle, there is no tendency for the vehicle to skid if one of the wheels encounters an icy spot on the highway. In other types of self-locking differentials, such a skid is almost unavoidable because the locking of the differential does not occur until one of the wheels slips with regard to the other. In fact, in the case of some commercial differentials which are supposed to be self-locking, the operator must actually apply the brake in order to energize the locking mechanism before it will become effective.

While the present differential is normally locked, it readily permits differential action whenever one wheel slows down in the same ratio in which the other driven wheel accelerates. Since this condition is obtained in the routine turning of a corner, the desired differential action is automatically achieved whenever such action is desirable.

In the preferred embodiment disclosed, at least the intermediate gears intervening between the differential drive gears and the axle gears move to and from engagement with the cage. In practice, the differential drive gears are also movable axially to and from cage engagement. In any event, since the intermediate gears are of somewhat smaller diameter than the differential gears and the axle-connected gears, the resulting braking action has mechanical advantage in resisting rotation of the differential drive gears and thereby assuring delivery of power to both wheels as long as engine torque is transmitted.

Figure 3:
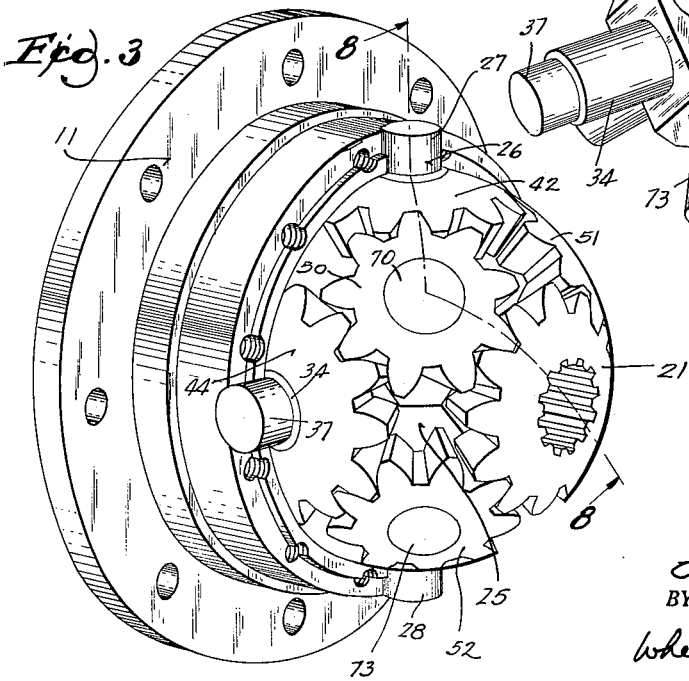
Figure 5:
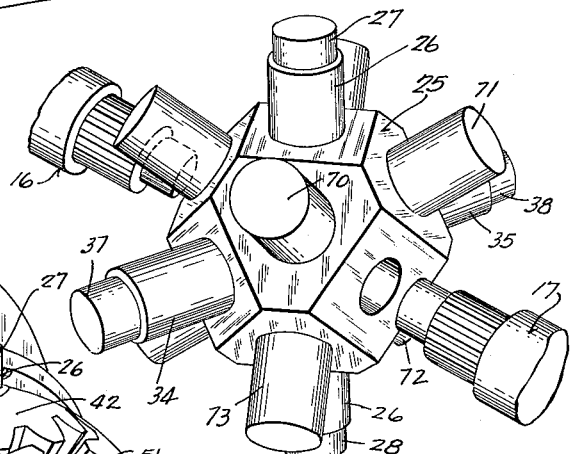

In the drawings:
FIG. 1 is a view in axial section through a differential gear set embodying the invention, the section being taken on line 1—1 of FIG. 2.
FIG. 2 is a view in transverse section taken on line 2—2 of FIG. 1.
FIG. 3 is a view in perspective showing the differential gear set with one section of the cage and one of the axle shafts removed.
FIG. 4 shows the gear set in end elevation with one of the axle shafts removed and the cage housing open, the disassembled cage housing section being illustrated beside the assembly.
FIG. 5 is a view in perspective separately showing a planetary gear carrier.
FIG. 6 shows a modified carrier in end elevation.
FIG. 7 is a fragmentary detail view on a section similar to that of FIG. 2 showing the modified carrier of FIG. 6 as it appears when assembled.
FIG. 8 is a diagrammatic elevational view of the gears taken on the line 8—8 of FIG. 3.
FIG. 9 is a fragmentary detail view, similar to FIG. 8 fragmentarily showing a modified embodiment in which the housing is also the carrier.
FIG. 10 is a fragmentary detail view similar to FIG. 9 showing a further modification.

The preferred differential cage 10 comprises two housing sections 11 and 12 having mating margins and connected by bolts 13 on the periphery of the housing. The sleeves 14 and 15 receive the axle shafts 16 and 17 which normally rotate with the housing to receive motion of the ring gear 18.

The axle shafts have splined connection with the axle-connected sun gears 20 and 21. As will hereinafter be explained, the axle-connected gears 20 and 21 are interconnected through pairs of planetary gears constrained, in accordance with conventional practice, to rotate with the cage. In the present device, these planetary gears include both differential and intermediate gears. All such gears and the housing have complementary braking surfaces which interact for the purposes of this invention to restrict differential action. In the preferred embodiments, these surfaces are spherical and the differential gears are mounted on pins which are radial respecting the spherical concave inner surface of the housing portion of the cage.

Fixed centrally within the cage and between the shaft-connected gears is a carrier which may be polygonal or spherical and from which pins project radially toward the housing portions of the cage to support the differential and intermediate gears. At least some of such pins are fixed in the carrier and the housing portion of the cage. Other pins may optionally be mounted in the intermediate gears and have bearings in the cage.

In the preferred construction, the reduced terminal portions 22 and 23 of the respective axle shafts are piloted in the planetary gear carrier 25 which is separately illustrated in FIG. 5. However, the housing portions of the cage may also serve as a carrier to supplement or eliminate carrier 25 as shown in FIGS. 9 and 10 hereinafter described.

Extending diametrically through the gear carrier 25 in the preferred construction shown in FIGS. 1–8 is a pin 26 having reduced ends at 27 and 28 for which complementary seats are provided in the mating margins of the housing sections 11 and 12 as best shown in FIG. 4 at 29 and 30. The pin 26 is transversely bored at 31 to receive the reduced ends 32 and 33 of the cross pins 34 and 35 which extend diametrically of the carrier 25 at right angles to pin 26. Like pin 26 the cross pins 34 and 35 have reduced extremities as shown by reference characters 37 and 38, these being received into the complementary channels 39 and 40 in the mating margins of the housing sections.

The planetary differential gears 42 and 43 are mounted on the ends of pin 26 adjacent the cage. Differential gears 44, 45 are similarly mounted on diametrical cross pins 34, 35. The pins 34, 35 and 26 fix the carrier portion of the cage to the housing portion thereof.

In the preferred embodiment of the invention as herein disclosed, the differential gears 42, 43, 44, 45 do not mesh directly with the axle-connected sun gears 20 and 21. Instead, each of the axle-connected gears meshes with four intermediate planetary gears, each of which, in turn, meshes with two of the driving gears. Thus, in FIG. 3, the axle-connected gear 21 is shown to be in mesh with the intermediate gears 50, 51, 52, 53. Intermediate gear 50 meshes with differential driving gears 44 and 42. Intermediate gear 51 meshes with differential driving gears 42 and 45. Intermediate gear 52 meshes with differential driving gears 45 and 43. In a similar arrangement, the axle-connected gear 20 meshes with four intermediate gears 46, 47, 48, 49, each of which meshes with two of the differential driving gears 42, 43, 44 and 45 as shown in FIG. 4.

The entire inner surface 60 of the cage housing 10 may be spherical, this being the preferred arrangement. The external ends of the several planetary gears, and particularly the intermediate gears above described, have bearing surfaces complementary to the interior of the housing portion of the cage as shown, for example, at 61, 62, 63 and 64 in FIG. 4. The inner end faces of the several planetary gears may either be flat or concavely spherically rounded depending on whether the carrier 25 has flat surfaces as shown in FIG. 5 or is spherical as shown at 250 in FIGS. 6 and 7. In any event, the intermediate gears 50, 51, 52 and 53 are also provided with pins 70, 71, 72 and 73 as shown in FIGS. 4, 5 and 6 and corresponding pins are provided for the like set of intermediate gears which meshes with the axle-connected gear 20 at the other side of the differential. It is broadly immaterial whether the pins or shafts for the intermediate gears are mounted in the gears to rotate therewith in bearings provided by the cage and carrier as shown in FIG. 10, or are fixed to the cage for the intermediate gears to rotate thereon as shown in FIG. 9. FIG. 9 shows a differential gear 42 on a stud shaft 260 and intermediate gear 50 on stud shaft 710, both shafts being fixed in the cage housing 10. FIG. 10 shows shafts 261 and 711 fixed in their respective gears and socketed in the housing and carrier portions of the cage to accommodate rotative and slight axial movement of the gears.

While a formula is available to define the positions of the several pins upon which the intermediate gears are mounted, it need only be stated here that the relationship is desirably a geometrical pattern in which each of the pins mounting an intermediate gear is disposed on a projected diagonal of an imaginary cube replacing the spider or carrier.

Some or all of the planetary gears, including the driving differential gears and the several intermediate gears, are not only rotatable on the axes of their respective pins but have limited axial movement to and from frictional braking engagement with the inner periphery of the housing portion of the cage. The sun gears also are desirably yieldable axially. In the interior view of housing element 11 in FIG. 4, the areas in which such frictional braking engagement occurs have been shown by stippling and designated by reference character 74.

The number of teeth and the pressure angles of the teeth of the planetary gears are desirably of such a character that the reaction thrust developed in driving the axle gears from the cage, supplemented by centrifugal force at normal straight driving speeds, will cause the planetary gears and the driving differential gears to move slightly outwardly on their respective pins into frictional braking engagement with the housing portion of the cage, thereby normally resisting differential action and assuring uniform delivery of power to the wheels regardless of traction. It has been found that the pressure angle should be at least 20°. In practice, 23° to 30° is used. However, the only upper limit may be a point at which the surface ceases to be a tooth for the transmission of motion during differential action.

It is to be noted that by using intermediate gears disposed in gear trains continuous about both sides of the cage as above described, a large percentage of the entire spherical interior surface of the cage may be used for braking action, there being very little clearance between the several meshing gears.

Inasmuch as the intermediate gears are materially smaller than the driving planetary differential gears and the axle-connected gears, there is mechanical advantage in the exercise of this braking effect. Moreover, in the preferred arrangement, such effect is exerted on substantially the entire outer end face of each of the planetary gears. The moment of the braking force is great and the braking action of the several intermediate gears is cumulative, whereby normal torque during straight forward operation develops an axial thrust upon each of the several intermediate gears to produce very pronounced limitation of differential action. An important and desirable factor is the augmentation of braking action by centrifugal force. At high speeds differential action is not desirable.

When the vehicle rounds a curve, the braking action is overcome to permit differential functioning of the gears. This operation can best be demonstrated by noting that the rotative motion of one axle shaft relative to the different carrier is insufficient to unlock the mechanism. Thus, it is necessary for both axle shafts to rotate in opposite directions relative to the differential carrier in order to unlock the unit and achieve smooth differential action.

For full braking action to limit differential movement, the present differential makes use of the principle of self-energization based on resistance to relative differences in the rate of rotation of the axles. However, whereas the conventional differential of this type is either non-automatic or has to develop the self-energizing resistance after the slipping has started, the present differential provides resistance to differential action which is continuously effective during non-differential operation and hence not only tends to preclude such action during normal operation but brings about the self-energizing increase of such resistance coincidentally with the initial tendency of either wheel to slip. Of course, the thrust developed by the pressure surfaces of the gear teeth is relieved appreciably when one of the driven axles is retarded at the same or substantially the same rate as the other is accelerated, thus accommodating relatively unimpeded differential action in turning corners.

In making a short turn, the vehicle speed and engine torque transmitted are both usually low, thus reducing centrifugal force as well as the tendency of gear thrust in the gear assembly to expand the gear set against the interior surface of the housing portion of the cage. Thus there is little self-energizing effect on the differential. However, the higher the axle speeds and the greater the torque transmitted by the engine, the greater will be the expansion of the gear assembly and the greater will be the pressure engagement of the braking surfaces of the axially movable planetary gears with the braking surfaces of the cage housing. This is a feature which minimizes the possibility of skidding of the type caused by ice encountered by one drive wheel at high vehicle speeds.

I claim:

1. In a differential for driving aligned shafts, the combination with a cage comprising a housing having mounting portions coaxial with said shafts and having interior braking surfaces, shaft-connected gears within the housing, planetary gears within the housing including driving differential gears and also including intermediate gears each meshing between a driving gear and a shaft-connected gears, means including pins normal to said braking surfaces of the housing and upon which the several planetary gears are rotatable and upon which at least some of said gears are free for limited axial movement to and from respective braking surfaces of the housing, the gears so movable having braking surfaces complementary to the respective braking surfaces of the housing, means for transporting the pins and the planetary gears with the housing while accommodating differential action of the planetary and intermediate gears between the shaft-connected gears, the several gears having mating teeth with pressure angles of at least 20° whereby the transmission of motion from the housing through the planetary gears to the axle-connected gears develops a reaction pressure on the intermediate gears tending to move them axially into braking engagement with the interior of the housing.

2. A differential according to claim 1 in which the cage includes a carrier disposed centrally therein and between the shaft-connected gears and with which the pins aforesaid are connected, the connection of said pins with the carrier and the housing constituting the aforesaid means for transporting the pins and the planetary gears with the housing.

3. A differential according to claim 1 in which the cage comprises a housing portion in which said pins are mounted.

4. A differential according to claim 1 in which said cage comprises a carrier disposed centrally therein and with which the pins aforesaid are connected, means including at least one of said pins for connecting the carrier with said housing for rotating in complete unison therewith and constituting the means for transporting the pins and planetary gears with the housing, the said braking surfaces of the housing being spherical and the braking surfaces of the planetary gears complementary thereto being spherical.

5. A differential according to claim 1 in which the driving differential gears and intermediate gears comprise trains which are continuous about the respective axle-connected gears, each such driving differential gear being connected with four intermediate gears and each axle-connected gear being connected with four intermediate gears, each intermediate gear being connected with one axle-connected gear and two driving differential gears.

6. In a differential for driving aligned shafts, the combination with a cage comprising a generally sperical carrier and a concentric housing having a generally spherical interior surface constituting a braking surface, of pin means extending radially and disposed between the carrier and the housing in a plane at right angles to the axis of the aligned shafts, driving differential gears upon said pin means, sun gears upon said shafts, other pin means extending radially between the carrier and the housing, and intermediate gears upon said other pin means and each meshing with two of the planetary differential gears and with one of said sun gears, said intermediate gears being of smaller radius than the differential gears with which they mesh and being relatively movable upon the other pin means to and from the housing and having spherical braking surfaces complementary to those of the housing, said intermediate gears having teeth with pressure angles of at least twenty degrees, whereby to be subject to reaction pressure tending to urge them outwardly into braking engagement with the braking surface on the interior of the housing whenever they are under load.

References Cited in the file of this patent

UNITED STATES PATENTS

| | | |
|---|---|---|
| 2,158,157 | Seeck | May 16, 1939 |
| 2,342,755 | Randall | Feb. 29, 1944 |
| 2,855,805 | Fallon | Oct. 14, 1958 |
| 2,855,806 | Fallon | Oct. 14, 1958 |
| 2,859,641 | Gleasman | Nov. 11, 1958 |
| 2,898,779 | Mickelson | Aug. 11, 1959 |
| 2,932,218 | Russell | Apr. 12, 1960 |
| 2,972,265 | Walter | Feb. 21, 1961 |